United States Patent
Frobel et al.

(10) Patent No.: US 6,763,741 B2
(45) Date of Patent: Jul. 20, 2004

(54) ADJUSTABLE FOOT-LEVER ASSEMBLY

(75) Inventors: Torsten Frobel, Hamburg (DE); Stephan Hoefig, Winsen (DE); Wolfgang Schweer, Neu Wulmstorf (DE); Michael Siemers, Hamburg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/156,662

(22) Filed: May 29, 2002

(65) Prior Publication Data

US 2002/0194947 A1 Dec. 26, 2002

(30) Foreign Application Priority Data

May 30, 2001 (DE) .......................................... 101 26 194

(51) Int. Cl.⁷ ................................................ G05G 1/14
(52) U.S. Cl. .......................................... 74/512; 74/560
(58) Field of Search .......................... 74/512, 513, 560; 180/320, 334, 335

(56) References Cited

U.S. PATENT DOCUMENTS

| | | | |
|---|---|---|---|
| 5,855,143 A | 1/1999 | Ewing | 74/512 |
| 5,927,154 A | 7/1999 | Elton et al. | 74/512 |
| 5,996,438 A * | 12/1999 | Elton | 74/512 |
| 6,019,015 A * | 2/2000 | Elton | 74/513 |
| 6,151,985 A * | 11/2000 | Garber et al. | 74/512 |
| 6,212,970 B1 | 4/2001 | Bortolon | 74/512 |
| 6,289,761 B1 * | 9/2001 | Reynolds et al. | 74/512 |
| 6,301,993 B1 * | 10/2001 | Orr et al. | 74/512 |
| 6,367,348 B1 * | 4/2002 | Toelke et al. | 74/512 |
| 6,367,349 B1 * | 4/2002 | Allen et al. | 74/512 |
| 6,510,761 B2 * | 1/2003 | Zhang et al. | 74/512 |
| 6,516,683 B2 * | 2/2003 | Sundaresan et al. | 74/560 |
| 2002/0078784 A1 * | 6/2002 | Hayashihara | 74/512 |
| 2003/0056615 A1 * | 3/2003 | Oberheide et al. | 74/512 |

FOREIGN PATENT DOCUMENTS

| | | | | |
|---|---|---|---|---|
| DE | 199 23 697 | | 11/2000 | 74/512 |
| DE | 100 33 342 | | 11/2001 | 74/512 |
| EP | 0 936 527 | | 8/1999 | 74/512 |
| EP | 0 982 645 | | 3/2000 | 74/512 |

* cited by examiner

Primary Examiner—Vinh T. Luong
(74) Attorney, Agent, or Firm—Crowell & Moring LLP

(57) ABSTRACT

An adjustable foot-lever assembly which has an outer pedal-bearing block held fixed to the vehicle, and an inner pedal-bearing block connected to the outer pedal-bearing block. A pedal is articulated on the inner pedal-bearing block. An articulation point is provided on the inner pedal-bearing block for a transmission element to a device to be actuated by the pedal. The position of the pedal can be set in a simple way to an operating position optimized in ergonomic terms by providing that during adjustment, the pedal executes in relation to the inner pedal-bearing block a movement which is composed of a translational movement and of a rotational movement.

42 Claims, 3 Drawing Sheets

ADJUSTABLE FOOT-LEVER ASSEMBLY

BACKGROUND OF THE INVENTION

This application claims the priority of German Application No. 101 26 194.2 filed May 30, 2001.

The present invention relates to an adjustable foot-lever assembly. Certain preferred embodiments of the invention relate to a foot-lever assembly for a motor vehicle and include an outer pedal-bearing block held fixed to the vehicle, an inner pedal-bearing block connected to the outer pedal-bearing block, a pedal articulated on the inner pedal-bearing block, and an articulation point on the inner pedal-bearing block for a transmission element to a device to be actuated by the pedal.

It is often desirable for the driver of a motor vehicle to adjust the pedals to be actuated by him, such as the brake pedal, the accelerator pedal and/or the clutch pedal, according to his body size or his wishes with regard to his sitting position. Thus, the driver may wish to bring the pedals nearer to his seat or set them further away from it. Due to the other space constraints, such as, for example, the steering-wheel arrangement, seat adjustment is often not sufficient for this purpose, and therefore pedal adjustment may also be provided in addition to the seat adjustment normally provided in vehicles.

German patent application DE 100 33 342.7-26 discloses an adjustable foot-lever assembly having an outer pedal-bearing block which is held, fixed to the vehicle, and which is connected to an inner pedal-bearing block. A pedal is articulated on the inner pedal-bearing block. Furthermore, a transmission element to a device to be actuated by the pedal is provided. To adjust the pedal for comfort purposes, the inner pedal-bearing block is moved in relation to the outer pedal-bearing block, so that the pedal itself executes a rotational movement about a theoretical axis of rotation at an articulation point for the transmission element.

A further adjustable foot-lever assembly is known from European patent document EP 0 936 527 A2 (corresponds to U.S. Pat. No. 5,927,154). In this foot-lever assembly, the pedal is likewise articulated pivotably on a bearing block. To adjust the pedal, a force is transmitted to the pedal via a threaded spindle. By virtue of this force, the pedal executes a pivoting movement about the articulation point on the bearing block.

In these known foot-lever assemblies, during adjustment the pedal executes in each case a rotational movement about a pivot axis lying at the upper end of the pedal, as a result of which rotational movement the pedal moves towards the driver and simultaneously upwards, or vice versa. However, this adjusting movement is not suitable for all intended uses. A smaller driver also has, as a rule, smaller feet, so that he requires a pedal position which is not only arranged nearer to the seat, but also at a lower level, that is to say nearer the floor of the interior. As already stated, however, in the known foot-lever assemblies, because of the rotational movement about an axis arranged at the upper end of the pedal, it is only possible to adjust the pedal in relation to the seat and simultaneously upwards.

Against this background, an object on which the present invention is based is to provide an adjustable foot-lever assembly, in which the position of the pedal can be set in a simple way to an operating position which is optimized in ergonomic terms.

This object is achieved according to certain preferred embodiments of the invention by an adjustable foot-lever assembly with an outer pedal-bearing block held fixed to the vehicle, an inner pedal-bearing block connected to the outer pedal-bearing block, a pedal articulated on the inner pedal-bearing block, and an articulation point on the inner pedal-bearing block for a transmission element to a device to be actuated by the pedal, wherein, during adjustment, the pedal executes a movement in relation to the inner pedal-bearing block which is composed of a translational movement and of a rotational movement.

The solution according to the invention is accordingly distinguished by a foot-lever assembly which has an outer pedal-bearing block held, fixed to the vehicle, and an inner pedal-bearing block connected to the outer pedal-bearing block. A pedal is articulated on the inner pedal-bearing block. Furthermore, a transmission element to a device to be actuated by the pedal is provided on the inner pedal-bearing block. According to the invention, the pedal, when adjusted for reasons of comfort, executes in relation to the inner pedal-bearing block two superposed movements, specifically a linear translational movement and a pivoting movement. By two movements being superimposed, the pedal can be adapted optimally for each driver according to the constraints predetermined by his body size and his corresponding foot size.

As a result of the pivoting movement, the pedal is moved towards the driver. The translational movement compensates the upward movement accompanying the pivoting movement about a pivot axis lying at the upper end of the pedal, by counteracting said movement, so that it is possible to adjust the pedal simultaneously towards the driver and downwards, or vice versa, thus corresponding, as a rule, to the natural boundary conditions of persons, since, as a rule, smaller people also have smaller feet, and vice versa.

The invention also affords the advantage that the adjustment movement of the pedal takes place only in relation to the inner pedal-bearing block. The latter remains unmoved during adjustment in relation to the outer pedal-bearing block. There is therefore no need for a compensation of the length of the transmission element and the actuating travel of the pedal always remains the same.

According to one embodiment, the inner pedal-bearing block consists of two plate-shaped elements which are oriented parallel to one another and between which the pedal is arranged. This embodiment makes it possible for mounting to be particularly simple. The two plates can be attached to the outer pedal-bearing block by means of conventional fastening elements. Other components, such as pedals, can be integrated between them without any problems. Moreover, the production of the plate-shaped elements is simple and therefore cost-effective. The foot-lever assembly acquires a compact and robust construction by virtue of the plates.

The pedal may be connected to the inner pedal-bearing block via two connecting elements. With only two connecting elements, a compact component which can be produced in a simple way is obtained.

According to a further embodiment, one connecting element consists of a bolt or sliding piece which is attached to the pedal and which runs in a linear guide slot introduced into the inner pedal-bearing block. The guide slot may, for example, have the form of a long hole. The other connecting element may consist of a connecting link which is connected at its one end to the inner pedal-bearing block and at its other end to the pedal, in each case pivotably. The pedal is thereby positively guided in relation to the inner pedal-bearing block, that is to say it can execute only an exactly defined movement. The sliding piece introduced in the guide slot brings about a translational movement, whilst the connecting link causes rotation or a pivoting movement. The two movements are superposed. The position and dimension of the connecting elements, in particular the position and length of the connecting link and the length of the slotted guide, are co-ordinated with one another in such a way that, during adjustment, the pedal executes the desired movement towards the seat and downwards, or vice versa. The connecting elements described are, in turn, advantageous because they correspond to standard connecting elements, thus, in turn, having a positive effect on costs.

To adjust the pedal, a force can be introduced into it. By means of the connecting elements arranged between the inner pedal-bearing block and the pedal, the pedal can execute only a defined positively guided movement as a result of the introduction of force. The bolt moves linearly in its predetermined guide slot; the connecting link is pivoted. This positive guidance results in the desired superposition of translation and rotation, along with the advantages already outlined.

The force for adjusting the pedal can be introduced into the pedal particularly simply via a threaded spindle. The latter may co-operate, for example, with the sliding piece running in the guide slot. For this purpose, an internal thread co-ordinated with the thread of the threaded spindle is provided in the sliding piece. The use of a threaded spindle allows a continuous setting of the pedal position. Moreover, the spindle may also be used for locking the set position.

The device according to the invention may be used in the case of a brake pedal, a clutch pedal and/or an accelerator pedal. When it is provided in the case of a plurality of pedals, all the pedals provided with the adjusting device according to the invention may be arranged in an outer pedal-bearing block. This allows a parallel adjustment of all the pedals. It is also conceivable, however, to provide a separate outer pedal-bearing block for each pedal. Each pedal can then be set individually.

The invention is explained in more detail below with reference to the exemplary embodiments illustrated in the drawing.

Other objects, advantages and novel features of the present invention will become apparent from the following detailed description of the invention when considered in conjunction with the accompanying drawings.

DETAILED DESCRIPTION OF THE DRAWINGS

Figure 1:
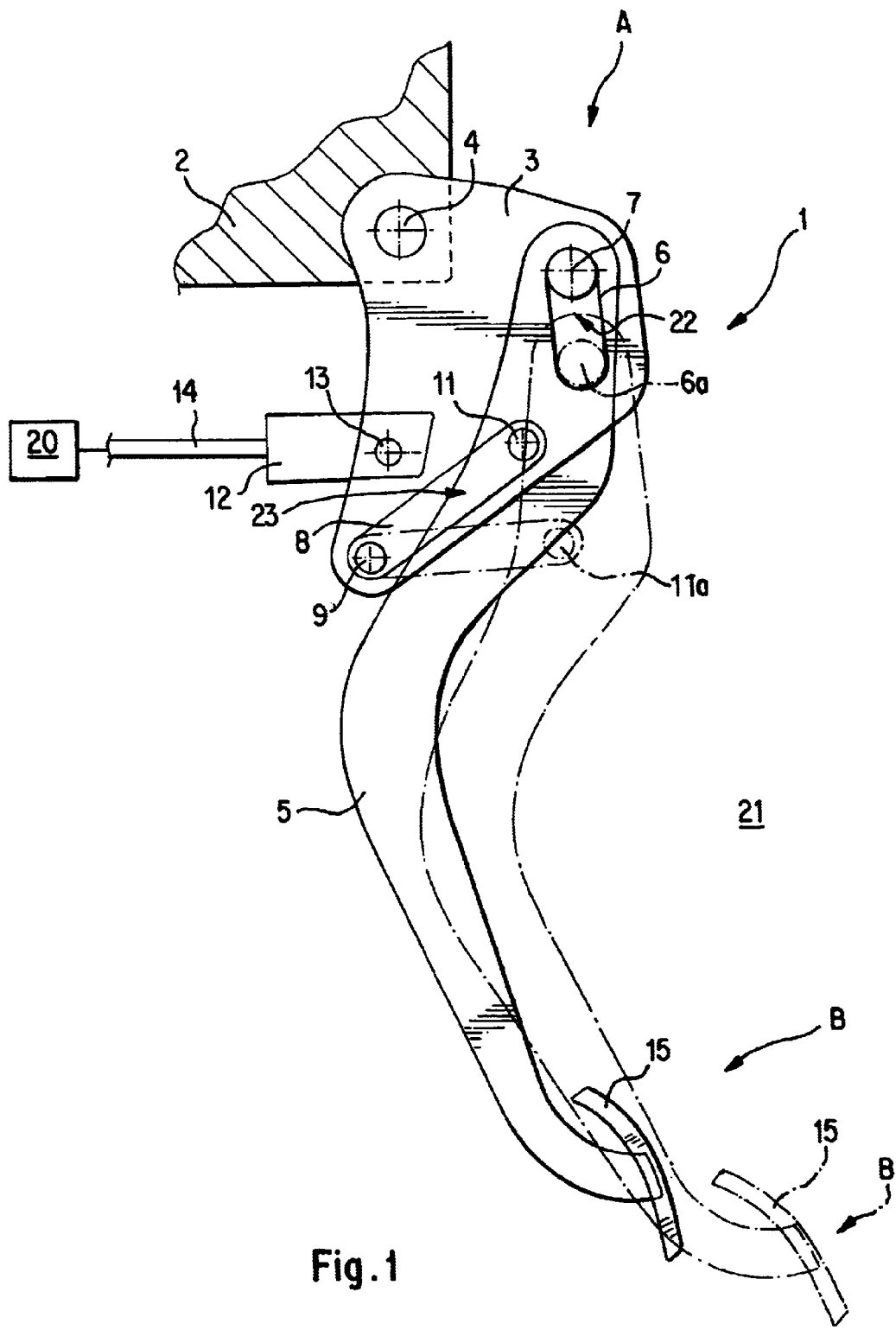
FIG. 1 shows a diagrammatic illustration of an adjustable foot-lever assembly constructed according to a preferred embodiment of the invention.

FIG. 1 illustrates an adjustable foot-lever assembly 1. The foot-lever assembly 1 has adjacent to it on the right a vehicle interior, not illustrated, on the floor of which is arranged, inter alia, a seat for the driver. The foot-lever assembly 1 has an outer pedal-bearing block 2 at its upper end. The pedal-bearing block 2 is connected fixedly to the vehicle 21. An inner pedal bearing block 3 is fastened to the outer pedal-bearing block 2. The inner pedal-bearing block 3 is connected to the outer pedal-bearing block 2 via an axis of rotation or pivot axle 4. The inner pedal-bearing block 3 has a plate-shaped design. The inner pedal bearing block 3 moves about the axis of rotation 4 in relation to the outer pedal-bearing block 2 when the foot-lever assembly 1 is actuated. The embodiment discussed above in which two inner pedal-bearing block plates are present parallel to one another and between which the pedal is arranged, is not illustrated in FIG. 1. One of ordinary skill in the art will recognize that the second inner pedal-bearing block would not be visible in a view as in FIG. 1 due to its location behind inner pedal-bearing block 3.

A pedal 5 is articulated on the inner pedal-bearing block 3 via two connecting elements 22, 23. For this purpose, on the one hand, a long hole 6 is introduced in the inner pedal-bearing block 3. A bolt 7 connected to the upper end of the pedal 5 engages into this long hole in such a way that this long hole 6 serves as a linear guide for the upper end of the pedal 5. A connecting link 8 is provided as a further connecting element between the inner pedal-bearing block 3 and the pedal 5. This connecting link has an elongate form. It is mounted rotatably at its one end 9 on the inner pedal-bearing block 3 and at its opposite end 11 on the pedal 5. The connecting link 8 serves for setting the pedal 5 in a pivoting movement during adjustment.

An articulation 12 is provided at an articulation point 13 on the inner pedal-bearing block 3. The articulation 12 is designed, here, as a fork. Attached to the articulation is a transmission element 14 to a device 20 to be actuated by the pedal 5.

It is assumed below, then, that the pedal 5 is initially in its upper position, that is to say the bolt 7 is arranged in the upper position in the long hole 6, and that the end 11 of the connecting link 8 likewise assumes a position pointing upwards in relation to the end 9. The cycle of movement during the adjustment of the pedal for comfort purposes is now described. When an adjusting force is applied, for example in the direction of the arrow A, to the pedal 5, the bolt 7 is moved along the long hole 6 at most until it has assumed the position 6a. However, any intermediate position of the bolt 7 in the long hole 6 may also be assumed. By virtue of the introduction of the force and the positive guidance of the bolt 7 in the long hole 6, the upper end of the pedal 5 therefore executes a downwards translational movement. By means of the second connecting element— the connecting link 8—, during the above-described introduction of force the pedal 5, as a result of the pivoting of the connecting link 8 about the point 9, is likewise pivoted, specifically until its end 11 assumes the position 11a. So that the connecting link 8 executes the desired movement, guides, in which the end 11 of the connecting link 8 moves, may be provided in the inner pedal-bearing block 3. This pivoting movement of the pedal is superposed on the above-described translation. This consequently generates a pedal movement which is composed of translation and of rotation.

By virtue of the arrangement of the long hole 6 and connecting link 8 in relation to one another and of their dimensions, the movement cycle of a pedal plate 15 arranged at the lower end of the pedal can be co-ordinated exactly when an adjusting force is introduced. It is thus possible to determine accurately by how much the pedal 5 is lowered when it moves forwards by a defined amount.

FIG. 1 illustrates both the initial position of the pedal 5 and the position of the pedal 5 assumed after the introduction of the adjusting force (cf. the pedal illustrated by broken lines). If these two positions are compared, it can be seen that, by virtue of the arrangement according to the invention, the pedal has been moved towards the driver and further downwards as a result of the introduction of the adjusting force. This movement is expedient in ergonomic terms, because, as a rule, smaller drivers also have smaller feet. When a smaller driver sets a pedal nearer to his seat, a lower pedal position normally likewise corresponds to the desired boundary conditions.

As soon as the optimum pedal position has been set via the adjusting force A, the pedal 5 is fixed in relation to the inner pedal-bearing block 3. The connecting elements 7 and 8 thereby maintain their position in the inner pedal-bearing block 3. If, then, an actuating force B is introduced via the pedal plate 15, this force is transferred to the transmission element 14 directly via the unit comprising the inner pedal-bearing block 3/pedal 5.

Figure 2:
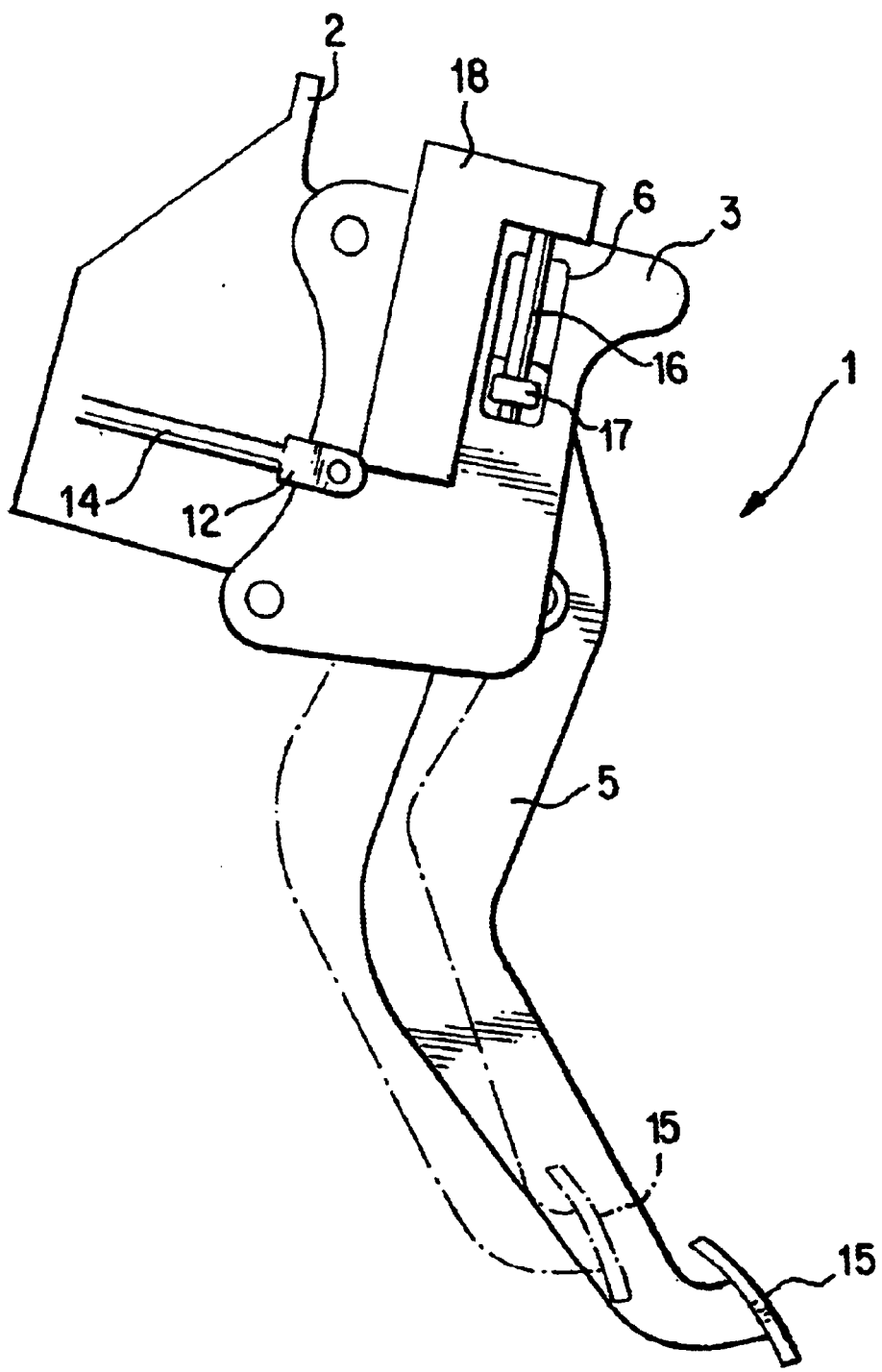
FIG. 2 shows a side view of an adjustable foot-lever assembly according to a preferred embodiment of the invention, with a device for applying a force to the pedal.

FIG. 2 illustrates a foot-lever assembly 1 adjustable according to the invention. Only the outside of the inner pedal-bearing block 3 is illustrated in the lateral illustration, and therefore the connection of the pedal 5 to the inner pedal-bearing block cannot be seen. In the exemplary embodiment illustrated, the adjusting force A is transmitted with the aid of a threaded spindle 16. The latter engages into an internal thread of a sleeve 17. The sleeve 17 may be attached, for example, to the bolt 7, designed as a sliding piece, in the long hole 6 of the inner pedal-bearing block 3, so that the force from the threaded spindle 16 acts directly on the pedal 5 via the sleeve 17.

The threaded spindle 16 is driven, here, via a motor 18. As soon as the motor stops, the set position is fixed via the frictional connection of the threaded spindle 16 in the sleeve 17. Any other locking mechanism and any other drive may also be provided.

Figure 3:
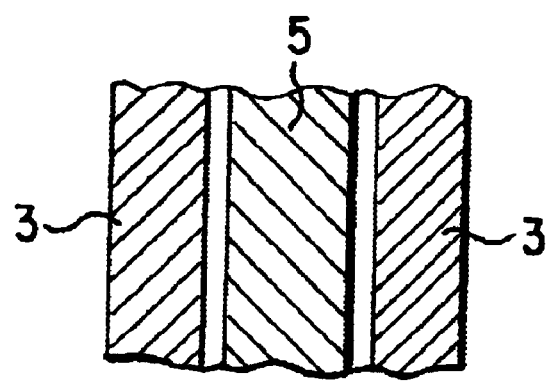
FIG. 3 is a detail of a cross section schematically showing the pedal-bearing block comprising two plate-shaped elements and the pedal between the plate-shaped elements according to another preferred embodiment of the invention.

According to FIG. 3 the inner pedal-bearing block 3 comprises two plate-shaped elements 3, 3 which are oriented parallel to one another and between which the pedal 5 is arranged.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Adjustable foot-lever assembly for a vehicle, with an outer pedal-bearing block held fixed to the vehicle,
    an inner pedal-bearing block connected to the outer pedal-bearing block, a pedal articulated on the inner pedal-bearing block, and
    an articulation point on the inner pedal-bearing block for a transmission element to a device to be actuated by the pedal,
    wherein the pedal is articulated on the inner pedal-bearing block via first and second adjustable connecting elements,
    wherein the first connecting element is attached to one of said pedal and said inner pedal bearing block and is guided for movement in a guide slot introduced into the other of said pedal and inner pedal-bearing block,
    wherein the second connecting element is a connecting link which is pivotably connected at its one end to the inner pedal-bearing block and at its other end to the pedal, and
    wherein the second connecting element is located between the first connecting element and a pedal plate of the pedal.

2. Adjustable foot-lever assembly according to claim 1, wherein the inner pedal-bearing block comprises two plate-shaped elements which are oriented parallel to one another and between which the pedal is arranged.

3. Adjustable foot-lever assembly according to claim 2, wherein the inner pedal-bearing block has the guide slot and the first connecting element is a bolt connected to the pedal.

4. Adjustable foot-lever assembly according to claim 1, wherein the inner pedal-bearing block has the guide slot and the first connecting element is a bolt connected to the pedal.

5. Adjustable foot-lever assembly according to claim 4, wherein an adjusting force means is provided for introducing a force into the pedal, for adjusting same by virtue of which the bolt moves linearly in the guide slot and the second connecting element pivots about its ends.

6. Adjustable foot-lever assembly according to claim 5, wherein the adjusting force means comprises a threaded spindle.

7. Adjustable foot-lever assembly according to claim 6, wherein the threaded spindle co-operates with the bolt running in the guide slot.

8. Adjustable foot-lever assembly according to claim 7, wherein during adjustment, the pedal executes a movement in relation to the inner pedal-bearing block composed of a translational movement and of a rotational movement.

9. Adjustable foot-lever assembly according to claims 7, wherein the guide slot is a linear guide slot.

10. Adjustable foot-lever assembly according to claim 1, wherein the pedal is one of a brake pedal, a clutch pedal and an accelerator pedal.

11. Adjustable foot-lever assembly according to claim 10, wherein the guide slot is a linear guide slot.

12. Adjustable foot-lever assembly according to claim 5, wherein the pedal is one of a brake pedal, a clutch pedal and an accelerator pedal.

13. Adjustable foot-lever assembly according to claim 1, wherein said second connecting element is a lever pivotally connected to each of the pedal and pedal-bearing block.

14. Adjustable foot-lever assembly according to claim 13, wherein during adjustment, the pedal executes a movement in relation to the inner pedal-bearing block composed of a translational movement and of a rotational movement.

15. Adjustable foot-lever assembly according to claim 4, wherein said second connecting element is a lever pivotally connected to each of the pedal and pedal-bearing block.

16. Adjustable foot-lever assembly according to claim 5, wherein said second connecting element is a lever pivotally connected to each of the pedal and pedal-bearing block.

17. Adjustable foot-lever assembly according to claim 1, wherein during adjustment, the pedal executes a movement in relation to the inner pedal-bearing block composed of a translational movement and of a rotational movement.

18. Adjustable foot-lever assembly according to claim 17, wherein the guide slot is a linear guide slot.

19. Adjustable foot-lever assembly according to claim 4, wherein during adjustment, the pedal executes a movement in relation to the inner pedal-bearing block composed of a translational movement and of a rotational movement.

20. Adjustable foot-lever assembly according to claim 5, wherein during adjustment, the pedal executes a movement in relation to the inner pedal-bearing block composed of a translational movement and of a rotational movement.

21. Adjustable foot-lever assembly according to claim 20, wherein the guide slot is a linear guide slot.

22. Adjustable foot-lever assembly according to claim 5, wherein during adjustment, the pedal executes a movement in relation to the inner pedal-bearing block composed of a translational movement and of a rotational movement.

23. Adjustable foot-lever assembly according to claim 1, wherein the guide slot is a linear guide slot.

24. Adjustable foot-lever assembly according to claims 4, wherein the guide slot is a linear guide slot.

25. Adjustable foot-lever assembly according to claim 5, wherein the guide slot is a linear guide slot.

26. Adjustable foot-lever assembly according to claim 6, wherein the guide slot is a linear guide slot.

27. An adjustable foot pedal assembly for a vehicle comprising: a pedal bearing block, a foot pedal movably supported at the pedal bearing block and operable in use to actuate a device in response to movement of the foot pedal, an adjustable connection assembly operable to change a position of said foot pedal with respect to the pedal bearing block, and a fixed bearing block which in use is fixed to the vehicle, wherein said pedal bearing block is pivotally mounted at the fixed bearing block, wherein said adjustable connection assembly includes first and second connecting elements connecting said pedal bearing block and pedal to one another, wherein said first connecting element is connected to one of said pedal and said pedal bearing block, said first connecting element being guidably supported in a guide slot at the other of said pedal and pedal bearing block, wherein said second connecting element is pivotally connected to each of the pedal and pedal-bearing block, and wherein the second connecting element is located between the first connecting element and a pedal plate of the pedal.

28. An adjustable foot pedal assembly according to claim 27, wherein the pedal bearing block comprises two parallel plate shaped elements disposed at opposite sides of the foot pedal.

29. Adjustable foot pedal assembly according to claim 28, wherein the guide slot is a linear guide slot.

30. An adjustable foot pedal assembly according to claim 27, wherein said first connecting element includes a bolt connected to said pedal bearing block and a slot guidably supporting said bolt at the said pedal.

31. An adjustable foot pedal assembly according to claim 30, wherein said second connecting element is a lever pivotally connected to each of the pedal and pedal-bearing block.

32. An adjustable foot pedal assembly according to claim 31, wherein during adjustment, the pedal executes a movement in relation to the inner pedal-bearing block composed of a translational movement and of a rotational movement.

33. Adjustable foot pedal assembly according to claim 31, wherein the guide slot is a linear guide slot.

34. An adjustable foot pedal assembly according to claim 27, wherein said second connecting element is a lever pivotally connected to each of the pedal and pedal-bearing block.

35. Adjustable foot pedal assembly according to claim 34, wherein the guide slot is a linear guide slot.

36. An adjustable foot pedal assembly according to claim 27, wherein said connection assembly includes an adjusting device operable to pivotally move the pedal bearing block with respect to the fixed bearing block.

37. An adjustable foot pedal assembly according to claim 36, wherein said adjusting device includes a threaded adjusting member.

38. Adjustable foot pedal assembly according to claim 36, wherein the guide slot is a linear guide slot.

39. An adjustable foot pedal assembly according to claim 27, wherein during adjustment, the pedal executes a movement in relation to the inner pedal-bearing block composed of a translational movement and of a rotational movement.

40. Adjustable foot pedal assembly according to claim 39, wherein the guide slot is a linear guide slot.

41. Adjustable foot pedal assembly according to claim 30, wherein the guide slot is a linear guide slot.

42. Adjustable foot pedal assembly according to claim 27, wherein the guide slot is a linear guide slot.

* * * * *